United States Patent [19]

Ransdell et al.

[11] Patent Number: 4,991,146
[45] Date of Patent: Feb. 5, 1991

[54] INTRUSION DETECTION SYSTEM

[75] Inventors: Bill J. Ransdell, Moline, Ill.; James J. Phelan, Bettendorf, Iowa

[73] Assignee: Deere & Company, Moline, Ill.

[21] Appl. No.: 443,684

[22] Filed: Nov. 30, 1989

[51] Int. Cl.⁵ .......................................... G01S 15/00
[52] U.S. Cl. ..................................... 367/98; 367/909
[58] Field of Search ........................ 367/909, 93, 98; 340/903; 364/461

[56] References Cited

U.S. PATENT DOCUMENTS

| | | | |
|---|---|---|---|
| 4,197,528 | 4/1980 | Gibson | 367/93 |
| 4,229,811 | 10/1980 | Salem | 367/93 |
| 4,290,126 | 9/1981 | McFadyen | 367/93 |
| 4,382,291 | 5/1983 | Nakauchi | 367/87 |
| 4,499,564 | 2/1985 | Sirai | 367/93 |
| 4,512,000 | 4/1985 | Masuko | 367/93 |
| 4,542,489 | 9/1985 | Naruse | 367/93 |
| 4,608,674 | 8/1986 | Guscott | 367/93 |
| 4,628,496 | 12/1986 | Lee | 367/93 |
| 4,639,902 | 1/1987 | Leverance et al. | 367/93 |
| 4,779,240 | 10/1988 | Dorr | 367/96 |
| 4,800,540 | 1/1989 | Annala | 367/87 |

OTHER PUBLICATIONS

Opcon Inc., "UC60—LN1A Ultrasonic Sensor—Installation Instructions", pp. 1-11, 1988.
International Automotive Products, "The Ultrasonic Tattletail", 4 pages.
Massa Products Corporation, "Model E—200 Ultrasonic Ranging Module", 7 pages, 1988.
BATS Inc., "Blindspot Warning System Model BS1000", 2 pages.
Opcon, Inc., "Sonic Sensors—Price List 600", 4 pages, 1988.
Weigand, "Montageanlleitung Range Master . . . ", 7 pages, 1988.

Primary Examiner—Thomas H. Tarcza
Assistant Examiner—Daniel T. Pihulic

[57] ABSTRACT

A microprocessor-based ultrasonic intrusion detection system includes an initialization mode wherein a plurality of echoes are cumulatively processed to produce a reference or signature data set representing the area to be monitored without intruding objects. Later received echoes are compared to this signature so that an intruding object will cause generation of an alarm signal. Time varying thresholds are utilized to compensate for attenuation caused by increased distance.

5 Claims, 13 Drawing Sheets

INTRUSION DETECTION SYSTEM

BACKGROUND

This application includes a microfiche appendix including one microfiche and 14 frames.

The present invention relates to an ultrasonic system for detecting intrusion of objects or persons into a monitored area.

Ultrasonic intrusion detection systems are known wherein reflected wave patterns are compared to reference patterns such as described in U.S. Pat. No. 4,499,564, issued on 12 Feb. 1985 to Sirai. In this system, the reference pattern is based upon the statistical mean values of a plurality of reflected waves. Then reflected wave patterns are statistically compared to the reference pattern and an alarm is energized when a sampling point of the reflected wave differs from a corresponding point of the reference pattern by more than a standard deviation.

A microprocessor-based system is described in U.S. Pat. 4,800,540 issued 24 Jan. 1989 to Annala. In this system, 100 bursts are processed and a reference table is generated which includes echo or no-echo flag values only for sample time points which consistently yield indications of echoes or non-echoes, respectively. Then, in a detection mode, portions of the reference table which include transitions in adjacent locations and the corresponding sampled signal locations are ignored.

Such systems are complex and are intended to filter out background noise and to reduce erroneous alarm indications. However, when such a system is to be adapted for use on a vehicle or on a piece of heavy machinery, then safety becomes of primary importance. For purposes of safety, it is preferable to accept some erroneous indications in the interest of insuring that legitimate intrusions produce an alarm signal. Accordingly, a relatively simple intrusion detection system which enhances safety is desired.

SUMMARY

These and other objects are achieved by the present invention which include an ultrasonic transducer, a transceiver and a microprocessor-based signal processing unit. In a-initialization mode, a plurality of echoes are cumulatively processed to produce a signature or reference set of data. In the detection mode, if any portion of an echo signal exceeds a signature threshold, then an alarm signal is generated to indicate intrusion of an object into the area being monitored.

DETAILED DESCRIPTION

Figure 1:
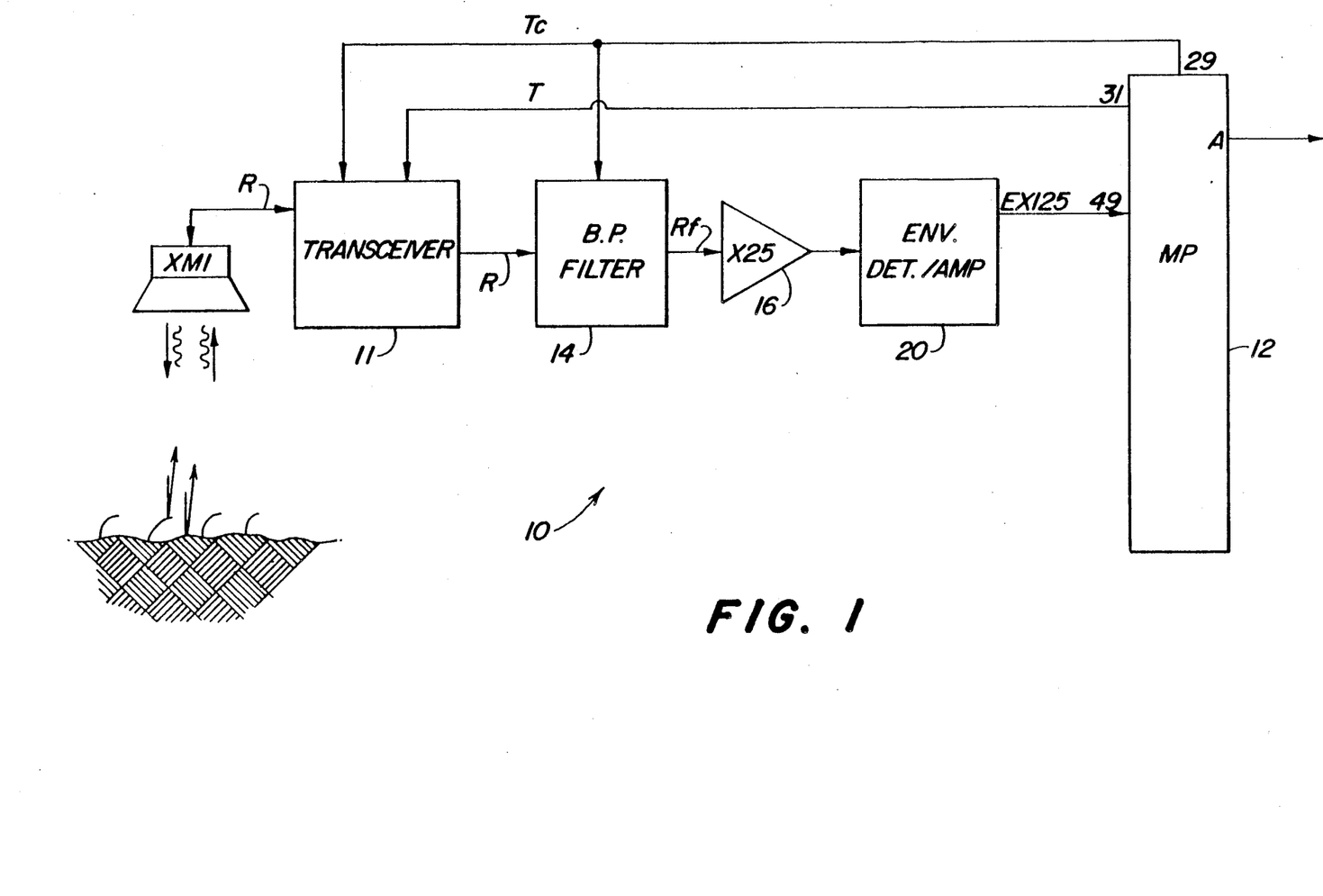
FIG. 1 is a simplified schematic block diagram of an ultrasonic intrusion detection system according to the present invention.
Figure 2:
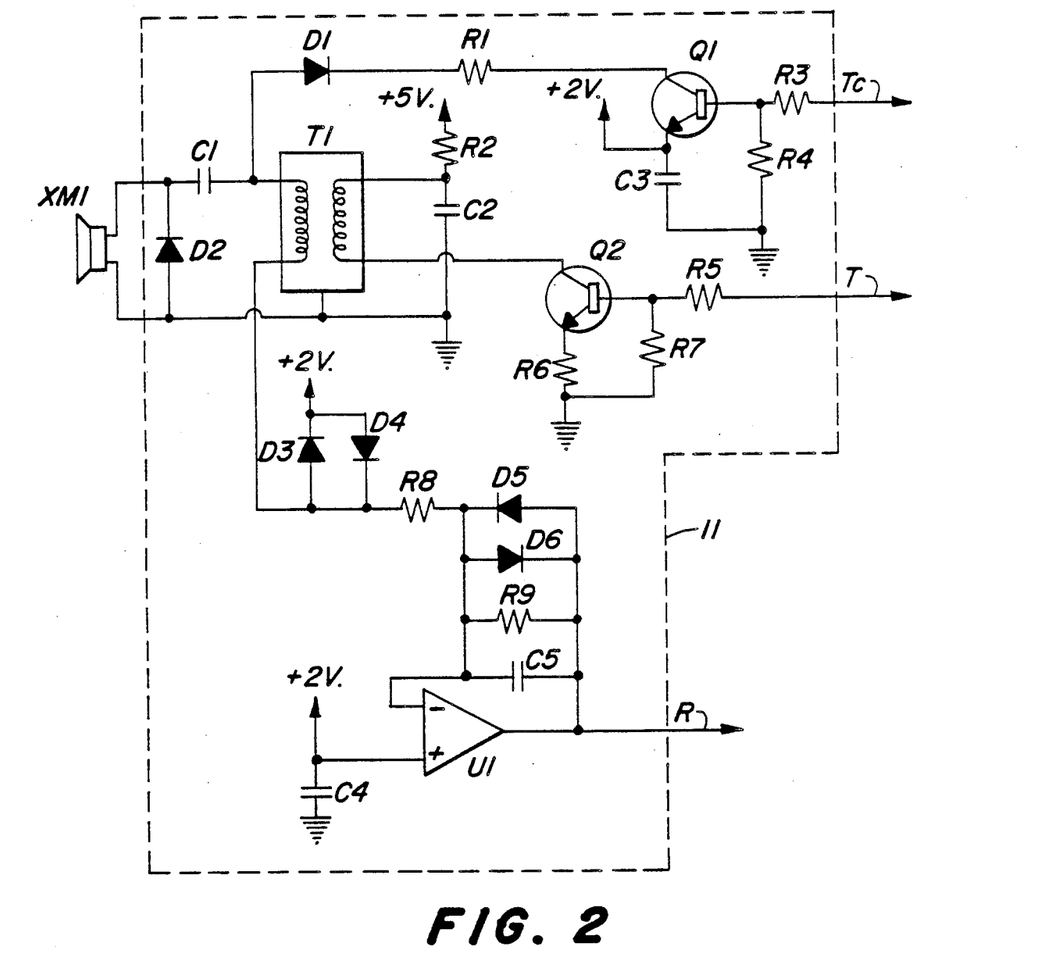
FIG. 2 is a detailed circuit diagram of the transceiver of FIG. 1.
Figure 3:
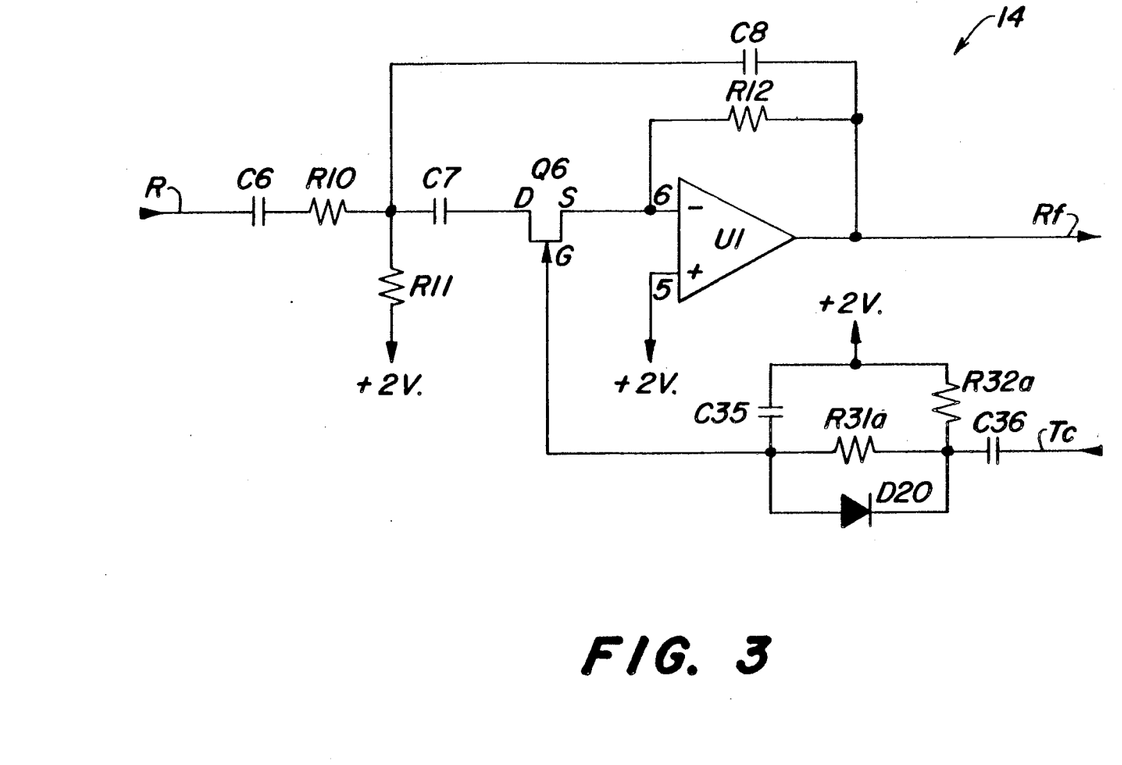
FIG. 3 is a detailed circuit diagram of the band-pass filter of FIG. 1.
Figure 4:
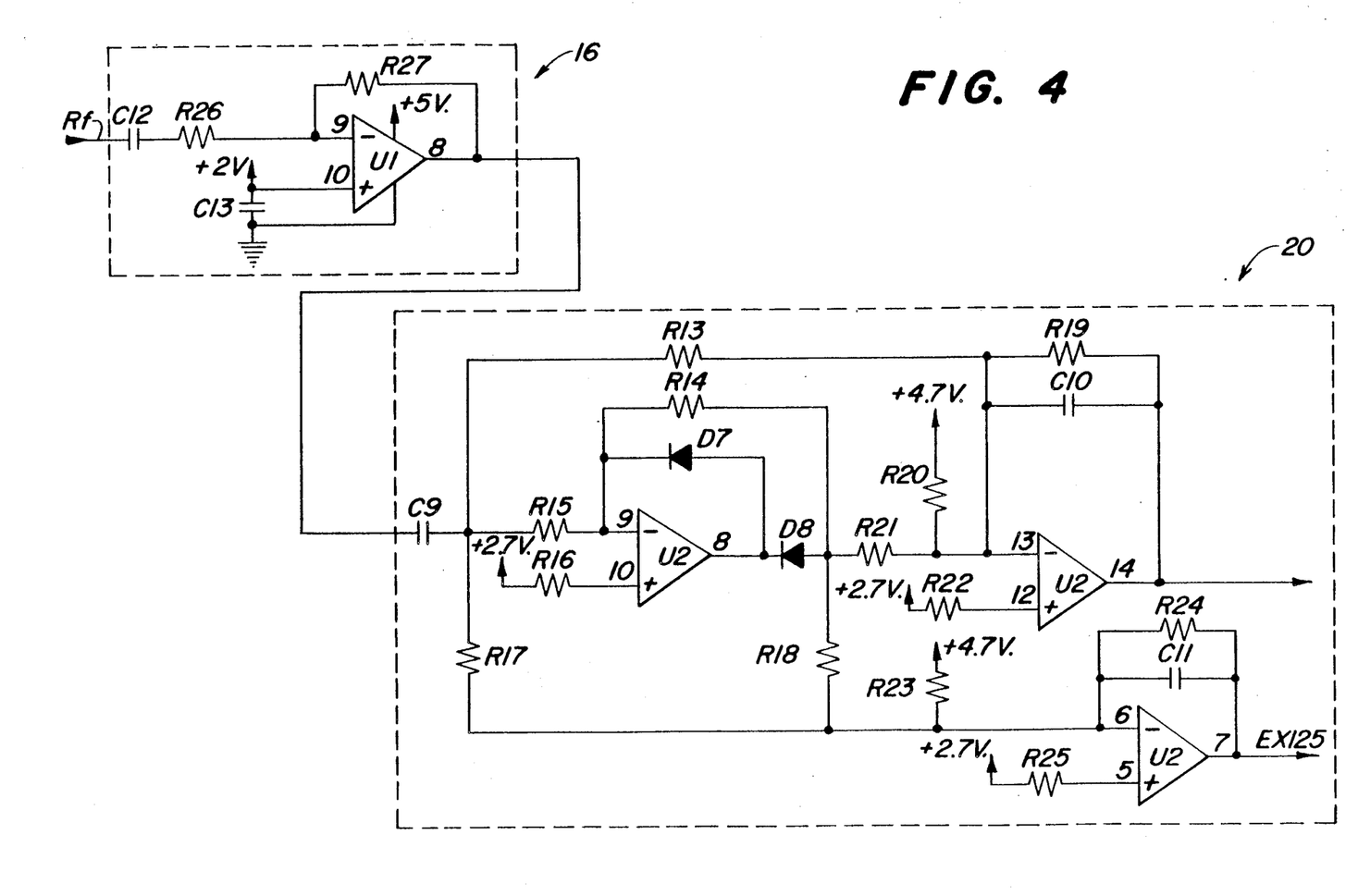
FIG. 4 is a detailed circuit diagram of the amplifier and envelope and detector/amplifier of FIG. 1.

Referring to FIG. 1, the intrusion detection system 10 includes an ultrasonic transducer XM1, such as an electrostatic ultrasonic transducer part No. 607281 manufactured by Polaroid Corp., coupled to a transceiver 11. The transducer XM1 directs an ultrasonic acoustic signal towards objects to be detected. The object or objects reflect an ultrasonic acoustic echo back to transducer XM1 with a time delay related to the relative distance between the object and the transducer. The transceiver 11 receives a transmit signal, T, with components at 45 and 55 kHz and a transmit mask or clamp signal Tc, both signals supplied by a microprocessor 12. The microprocessor may be a standard microprocessor with an integral analog-to-digital (A/D) converter, such as the MC 68HC11 manufactured by Motorola. The transceiver 11 provides the transmit signal to transducer XM1 and receives the echo or received signal, R, from transducer XM1 and provides it to a second order band pass filter 14 with a center frequency of 50 kHz.

The band pass filter 14 also receives the transmit clamp or mask signal TC and provides a filtered receive signal Rf to an amplifier 16 with a gain of 25. The output of amplifier 16 is coupled to an envelope detector/amplifier 20. Thus, a rectified, amplified and filtered envelope signal E with gain of 125 is supplied to an A/D input of the microprocessor 12.

The microprocessor 12 receives the amplified, filtered envelope receive signal, executes an algorithm and produces an alarm signal under certain conditions as hereinafter described in detail. For more detailed information concerning the circuit shown in FIG. 1, the reader may refer to FIGS. 2-5 and the component examples set forth in the component tables.

Figure 5:
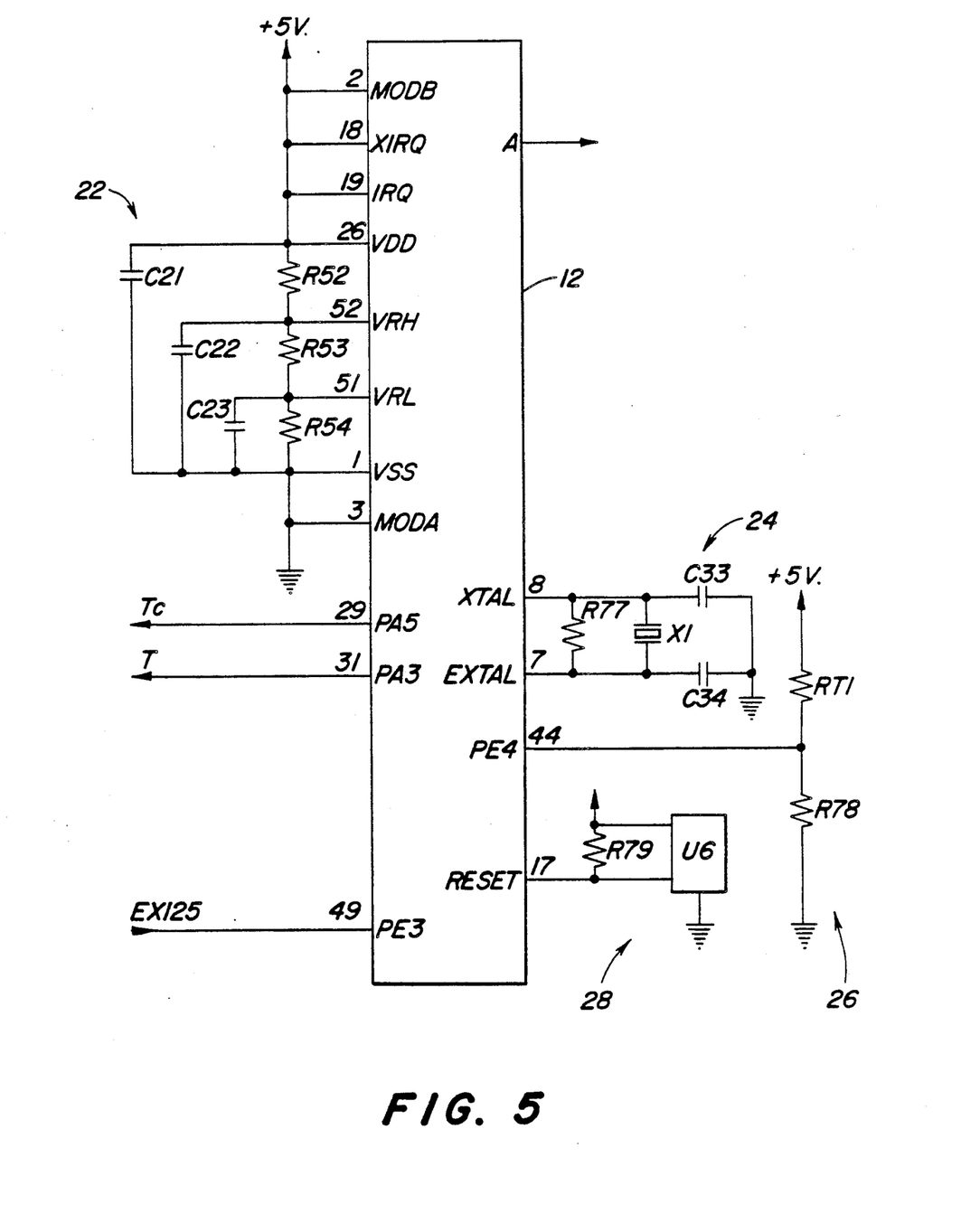
FIG. 5 is a detailed circuit diagram of the portions of FIG. 1 including the microprocessor.

Referring to FIG. 5, a resistor/capacitor network 22 is coupled to the mode, power, interrupt and A/D reference inputs of the microprocessor 12. Also, connected to the micro 12 is a timing crystal circuit 24 and a temperature compensating circuit 26 and a reset circuit 28.

The micro 12 executes an algorithm which will now be described with reference to FIG. 6a-6h. For further details concerning the algorithm, the reader is referred to the exemplary assembly language computer program listing in the microfiche appendix.

The algorithm begins with start, system setup and analog-to-digital converter (A/D) startup in steps 100-120. In step 130, the A/D is read to determine whether this particular unit is a master or slave unit with other units if a plurality of these units are combined. This step can be dispensed with if this particular unit operates as a stand-alone unit. Then step 150 sets a starts-transmit timer and step 160 restarts the A/D. Then steps 170-230 operate to calculate and store an average A/D "base-line" or "zero"value (ZVAL) from a series, 16 for example, of consecutively read A/D values.

Step 240 gets a predetermined signature scan count value, SSCAN, 20 for example, which represents the number of separate echo signals which will be utilized or processed to generate in step 630 a signature data array which comprises the initial or reference echo signal "signature" or "image" to which data produced by later received echo signals will be compared in step 720. Step 250 initializes a signature amplitude threshold value, AMPTHS, and a non-signature amplitude threshold value, AMPTHN, below which the echo signals are ignored (see steps 600-620 and 690-710). These threshold values start out high and are gradually and incremental decreased to lower values.

Then step 260 initializes a train count value and a pulse count value. The train count value represents the number, preferably 7 or 13, of pulse trains which make up each transmit signal. The pulse count value represents the number, preferably 8, of toggles of port A within each train. For sensing over shorter distances, 7 trains are used and for longer distances 13 trains are used. Steps 270-290 operate to cause step 285 turn on a Synch Pulse value or to cause step 295 to set a counter for the start of transmit time at the proper time depending upon whether this particular unit is a master or slave unit.

Steps 300-340 (together with step 260) operate to periodically toggle (at step 300) the output of port A of the microprocessor to qenerate a transmit signal pulse. This transmit pulse train is applied to the transceiver 11 and causes the transducer XM1 to emit a burst of ultrasonic sound which hits any surfaces within a certain region, from which echoes are reflected back and are received by the transducer XM1, resulting in an amplified echo envelope signal being supplied to pin 49 and the A/D of microprocessor 12.

Following generation of this transmit pulse train step 350 turns on a transmit clamp signal Tc to which is applied the transceiver 11 to reduce "ringing" in the transceiver 11. Then step 360 turns off the Synch Pulse for purposes of synchronization of multiple units in connection with steps 270-290.

A timer reference value, CTR, (derived from a continuously running hardware timer counter internal to the microprocessor) is set in step 370 to represent a delay time of 1.5 milliseconds, for example, between the start of the transmit signal and the start of a detect period, and a scan counter value is zeroed in step 380 to represent the duration of a time period during which echo envelope signals will be processed. Step 390 causes the algorithm to pause until the delay time period has expired following the clamping of the transmit signal so that any ringing in the transceiver will have died down before any echo envelope signals are processed, whereupon the internal A/D is restarted in step 410 to generate a binary DATA value representing the amplitude of the envelope echo signal at input terminal 49 of the microprocessor 12. A zero time timer reference value, CNTN, is saved at step 420.

In step 430 a scan rate time reference value is set and step 440 causes the algorithm to wait until the scan rate timer reference value is reached so that the echo signal at the A/D input of the micro 12 will be sampled at a desired rate of every 140 microseconds, for example. Then step 450 saves the old CNTN value from step 420 as a current timer reference value, CNTC, for use in connection with a variable gain feature described later herein with reference to steps 540 and 550.

Then in step 470 the current value at micro input 49 is sampled, analog-to-digitally converted and stored as a data value. Then, in step 480 the A/D is restarted so that its registers will be cleared for later conversion of a new DATA value and in step 490 the converted data value is stored as a binary ADC value which represents the current amplitude of the echo envelope signal. Then, in step 500, the present timer count, from beginning of transmit, is saved as a CNTN value.

In step 510 the ZVAL value from step 230 is subtracted from ADC to obtain a DATA value. Steps 520 and 530 then operate to ensure that only non-negative DATA values are utilized later in the algorithm.

Steps 540 and 550 operate to determine a gain value, GAIN, from the most significant bit of the CNTC value. Thus, the gain value, GAIN, will vary as a function of time from a low value (compensating for strong amplitude early echoes from near surfaces) to a high value (compensating for lower amplitude later echoes) from distant surfaces.

In steps 560 and 570 the ADC value is multiplied by the GAIN value and this multiplied value is stored as ADC. In step 580 the sample count value, CNTS, is compared to a minimum value representing a near distance, such as approximately two feet, so that objects intruding at a distance of closer than this distance will be ignored. If CNTS is less than this minimum value, then the algorithm is directed to step 640. Otherwise, the algorithm proceeds to step 590 which tests the scan count timer value, SCCAN, to determine whether or not the algorithm has completed processing of the initial twenty echo signals to determine the data "signature". If not, the algorithm proceeds to step 600, otherwise to step 690.

Steps 600 and 610 operate to gradually and stepwise reduce the amplitude threshold value, AMPTHS, from an initial high value (representing about 1.14 volts) down to a minimum value (representing about 0.38 volts). This compensates for attenuation from further objects. Step 620 then compares the data value (ADC) from step 570 with the AMPTHS value and if ADC is greater than or equal to AMPTHS, then a flag or a binary one is stored in a corresponding position in a 360 bit signature data array by step 630. This signature data array initially contains all zeros, but steps 620 and 630 operate to replace a zero with a one whenever the data value ADC exceeds the AMPTHS value during processing of the first twenty echo signals. If ADC is less than AMPTHS, then the algorithm proceeds to step 640 without changing the corresponding bit in the signature data array. Thus, once a flag (one) is entered into the signature data array, that flag remains in that location of the data array until the system is reset. In this manner, the first twenty echo signals Is cumulatively processed and a 360 bit data array of ones zeroes will be generated to represent a cumulative "signature" of the first twenty echo signals.

Referring back to FIG. 6f and step 590, if the signature data array has been completed (20 echoes processed) then step 590 will direct the algorithm to steps 690 and 700 which operate to gradually and stepwise reduce the non-signature amplitude threshold value AMPTHN from a high value (representing approximately 1.5 volts) down to a minimum value (representing approximately 0.29 volts). Then step 710 compares the most recent ADC data value to AMPTHN and directs the algorithm to step 640 and ignores ADC values which are less than AMPTHN. Otherwise, step 710 directs the algorithm to step 720 which tests the signature data array. If a one is in the corresponding location in the signature data array, then it means that the present echo signal matches the signature and step 720 directs the algorithm to step 640. If a zero resides in the corresponding position in the signature data array, then it means that the present echo signal differs from the signature and step 720 will direct the algorithm to steps 730-750 which cause an alarm signal to be generated at port A for a certain duration. Then step 760 sets a timer for the timing of the next transmit signal so that the transmit signals are generated at a 100 millisecond repetition rate and directs the algorithm to step 655.

Figure 6A:
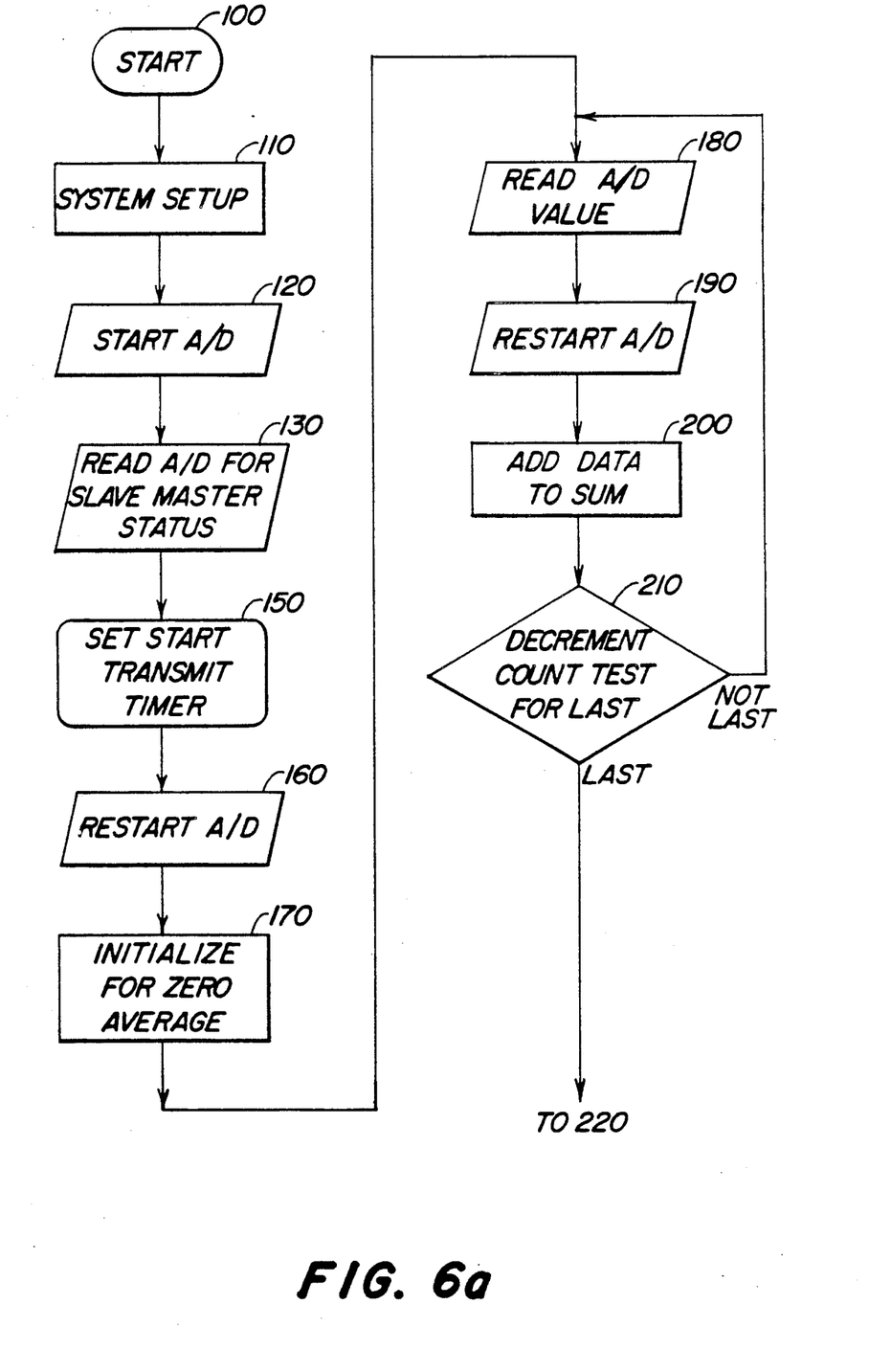
FIGS. 6a-6h comprise a logic flow diagram of the algorithm executed by the microprocessor of FIG. 1.
Figure 6B:
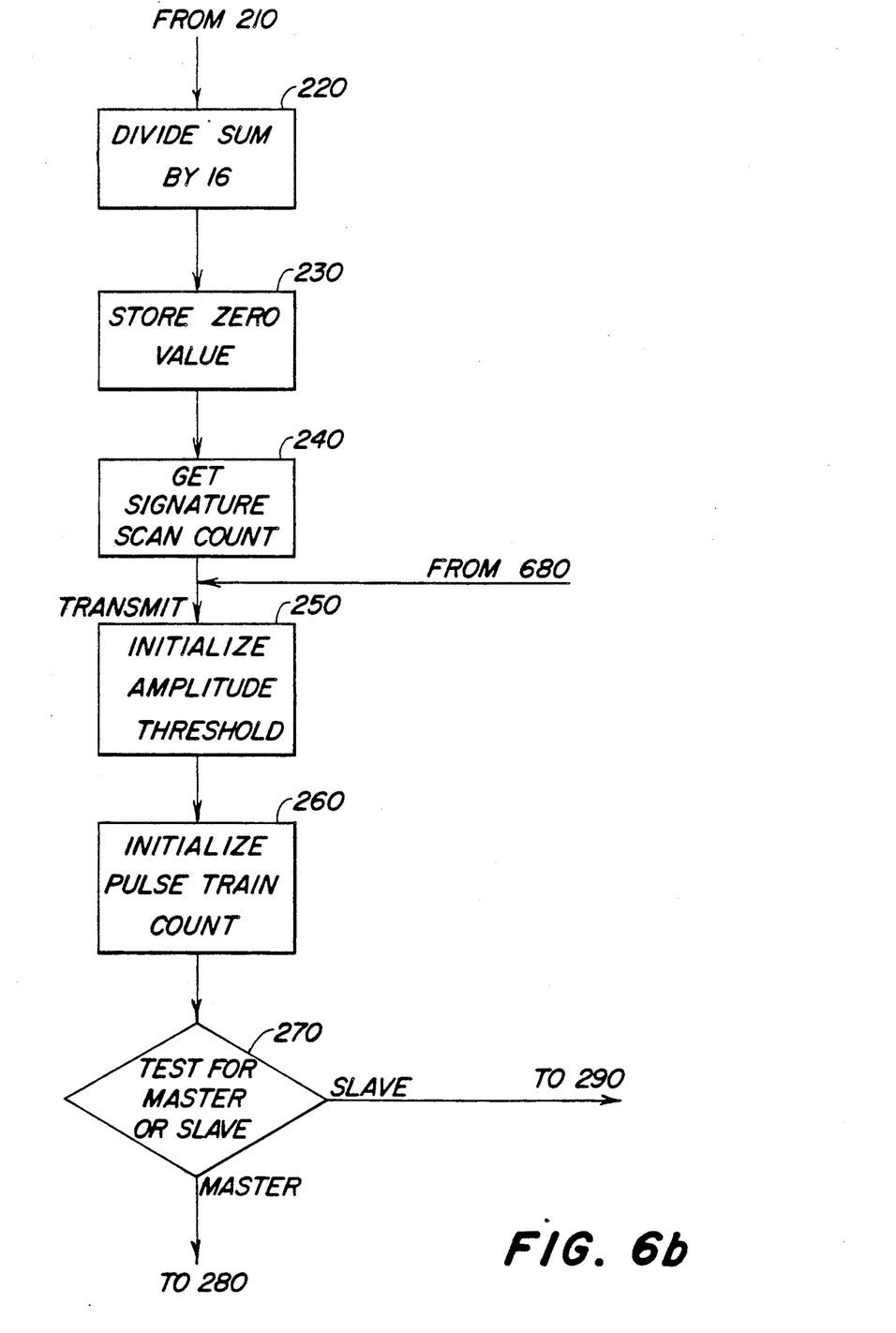
Figure 6C:
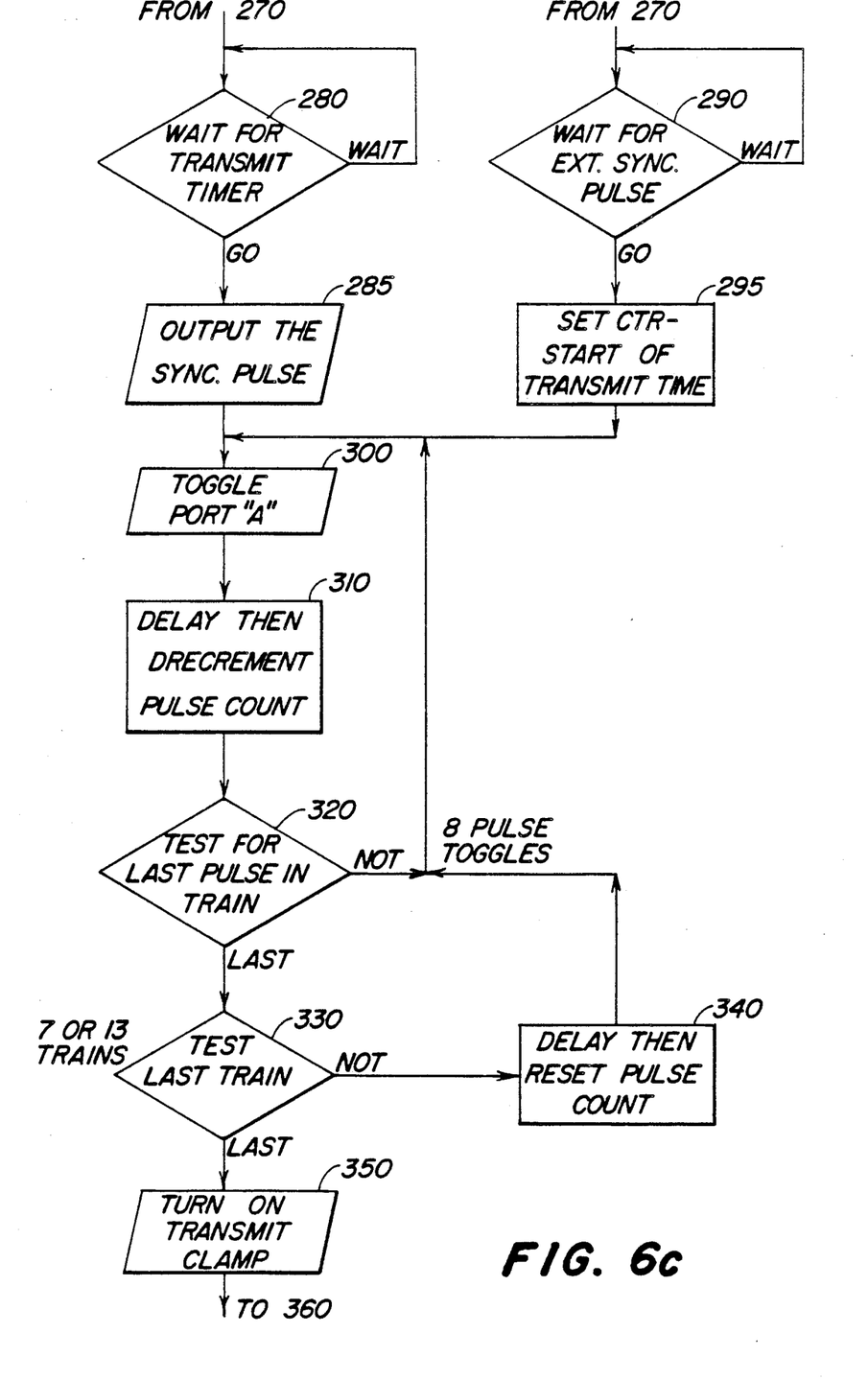
Figure 6D:
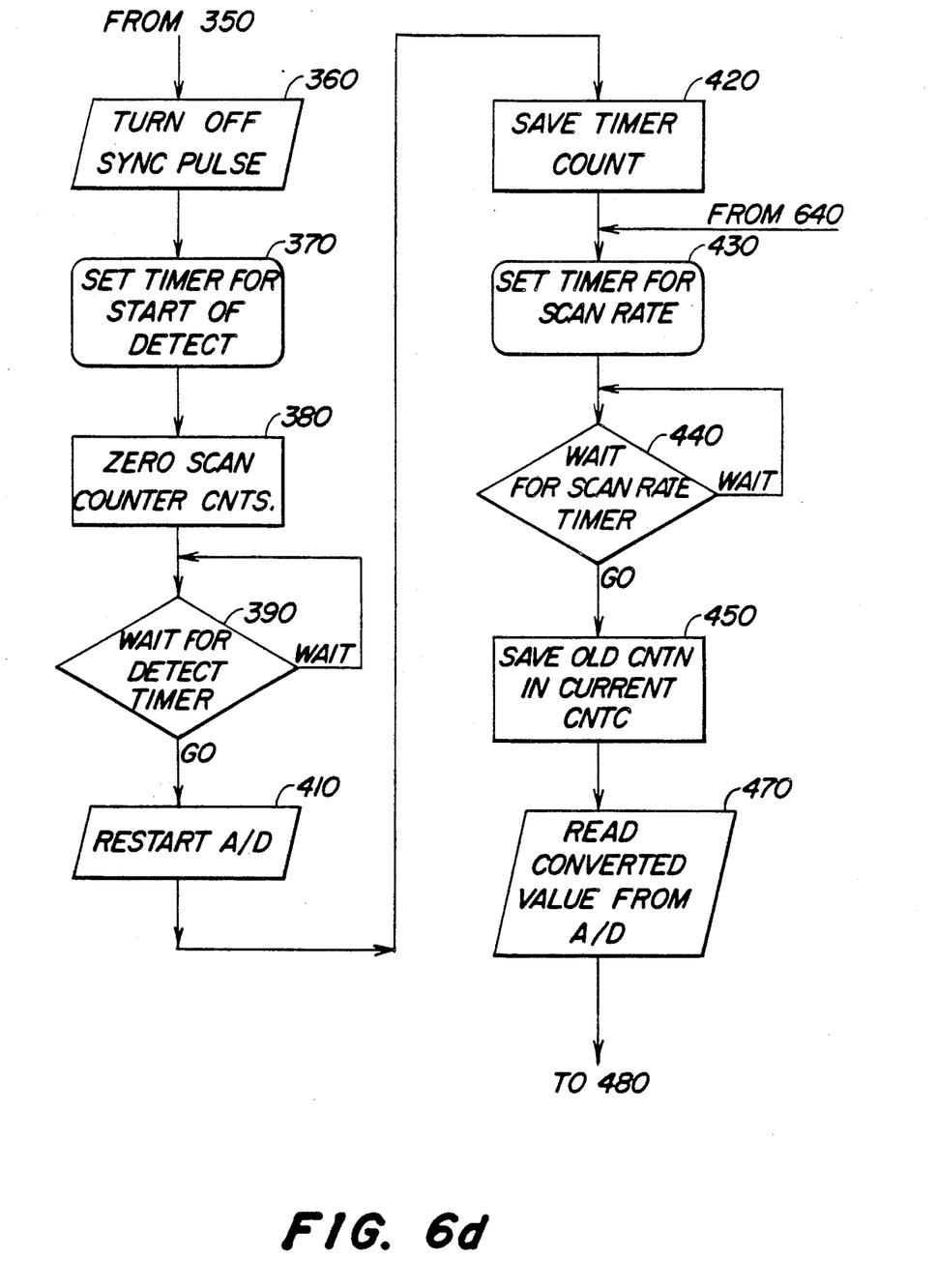
Figure 6E:
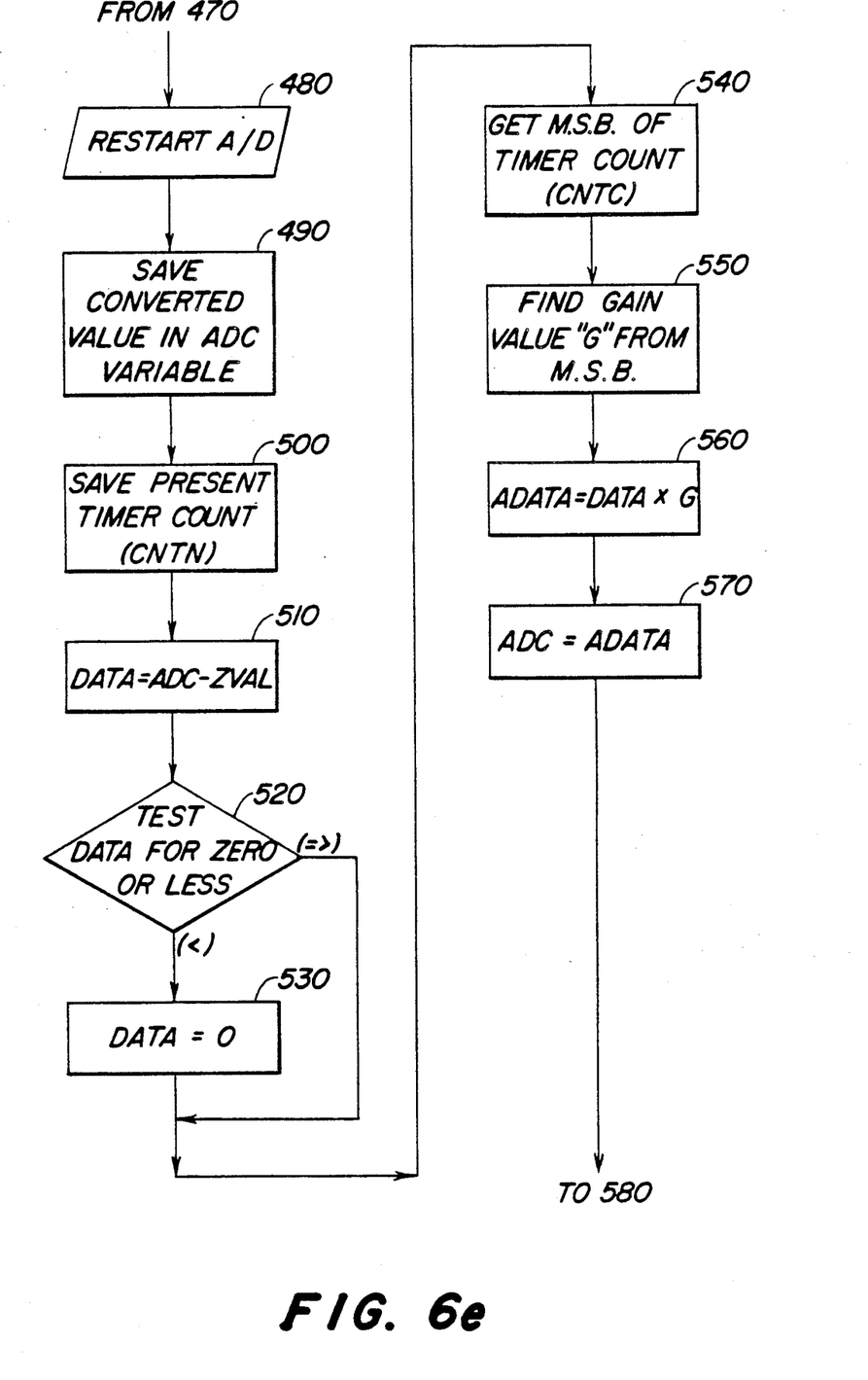
Figure 6F:
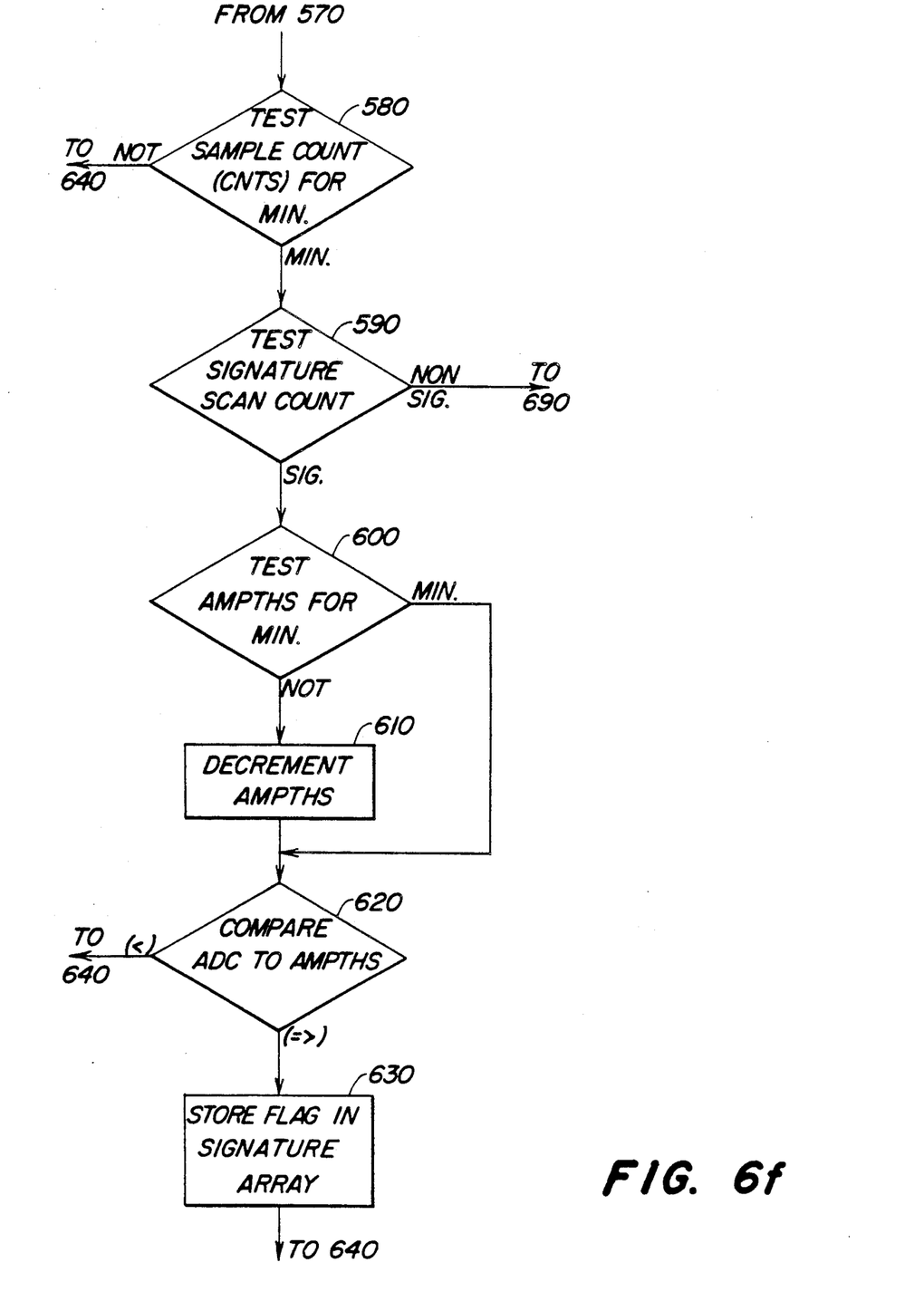
Figure 6G:
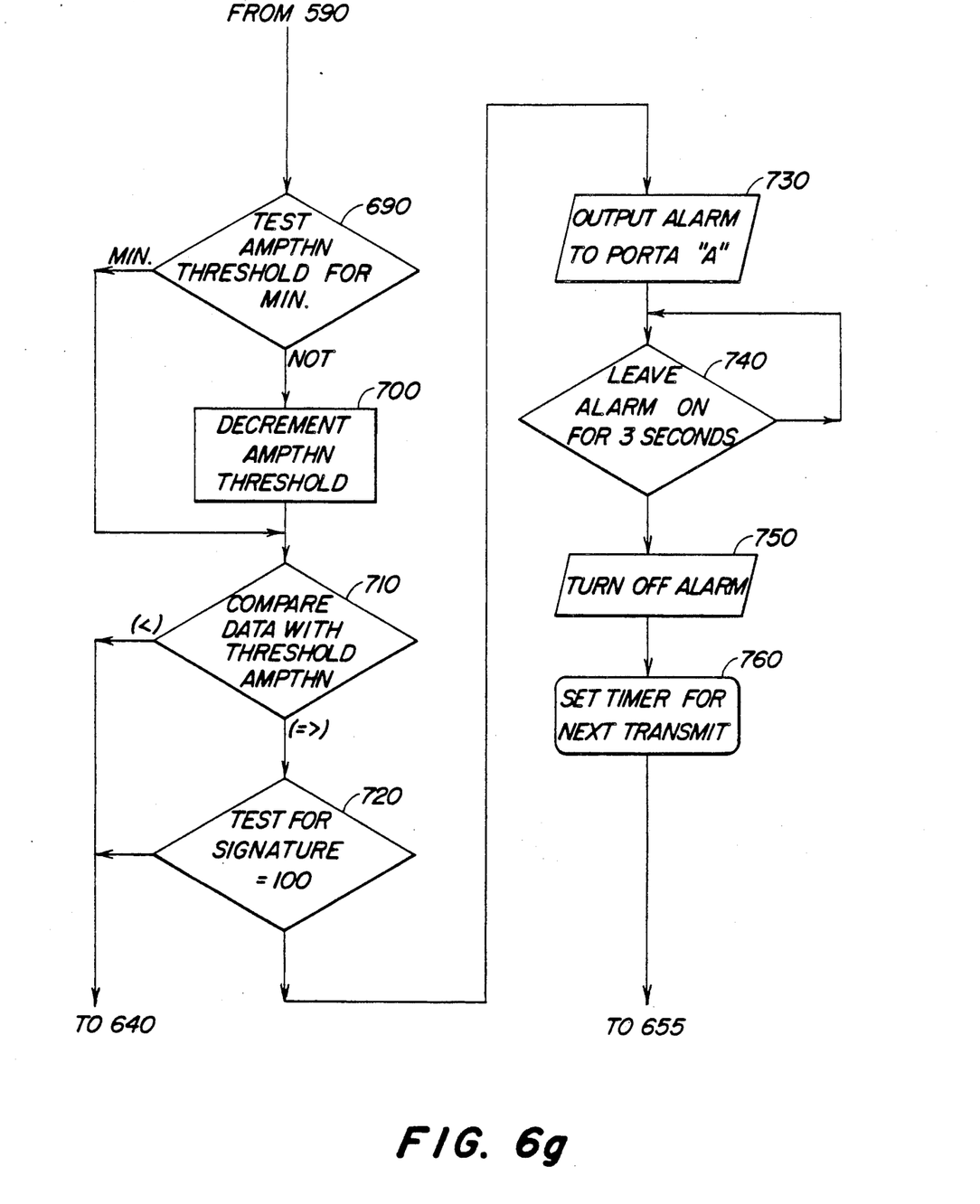
Figure 6H:
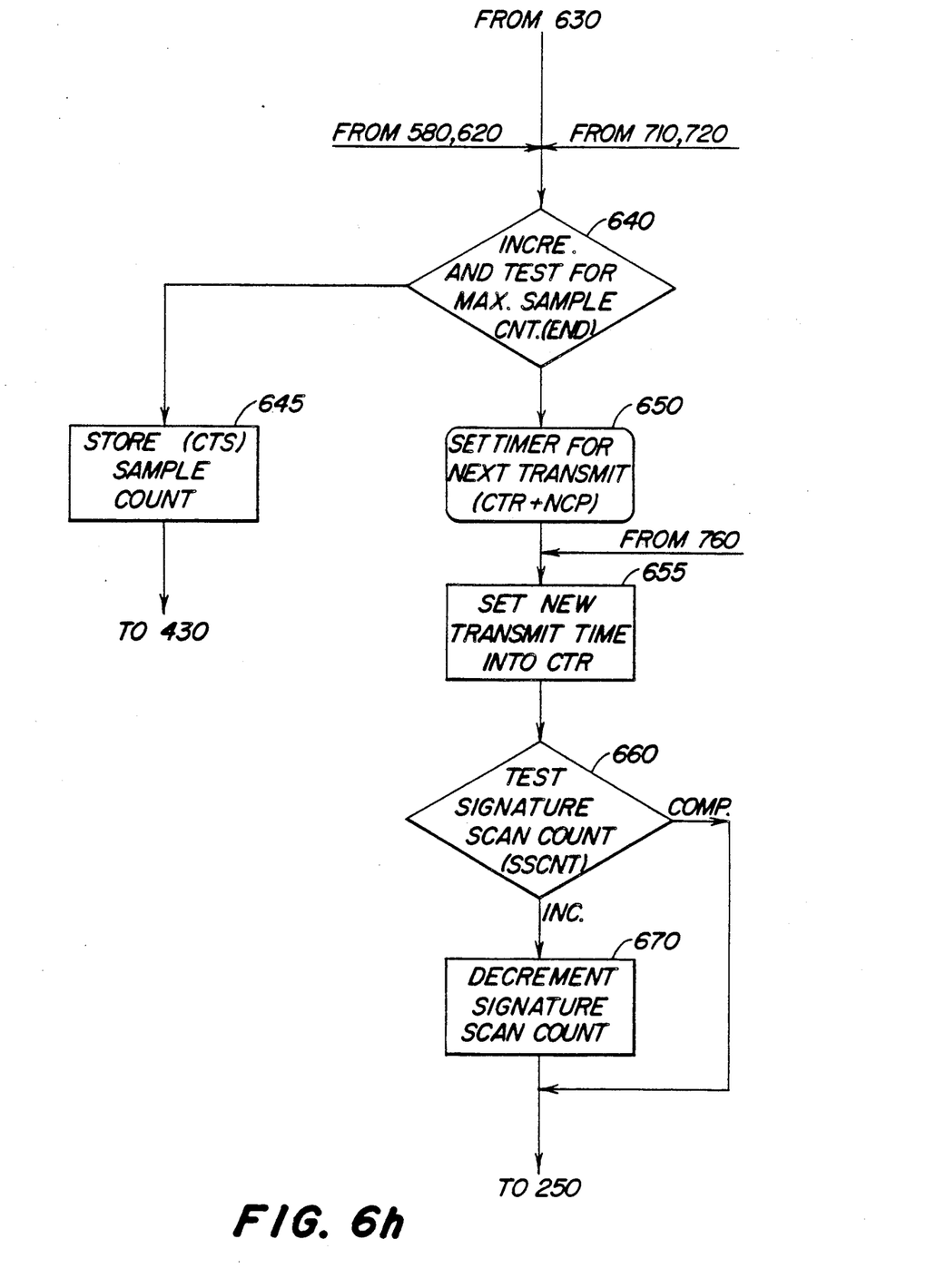

Referring now to FIG. 6h, step 640 increments and tests a timer or counter for a maximum sample count value which can be chosen to determine the maximum object distance from which echoes can be processed by this system. If this maximum value has not yet been reached then step 645 stores the current sample count value, CTS, and the algorithm is directed back to step 430 for processing of the next sample of the echo signal. If this maximum value has been reached, then step 640 directs the algorithm to step 650 which sets the timer for the timing of the next transmit signal so that transmit signal will be generated every 100 milliseconds.

Step 655 sets this new transmit time value into the counter value, CTR. Then steps 660 and 670 operate (together with steps 590) to test and decrement the signature scan count value so that only the desired number (20 for example) of echo signals will be processed to determine the initial echo signal signature data array to which later received echo signals are compared (in step 710). After step 760 the algorithm returns to step 250 whereupon a new transmit signal is generated and the algorithm is executed again.

Component Table

| Schematic Designation | Description |
|---|---|
| T1 | Transformer 40:1, Poloroid No. 605541 |
| X1 | Crystal, 8.0 MHZ |
| U1, U2 | IC, Quad OP-AMP, MC 33074 |
| U6 | IC, Reset Circuit, MC33064P-5 |
| Q1 | Transistor, MMBTA42, SMO |
| Q2 | Transistor, Darlington, MMBTA14, SMO |
| Q6 | Transistor, FET 2N4393 |
| D1, D2 | Diode, 1N4006 |
| D3 + 4, D5 + 6, D7 + 8 | Diode Pair, SMO MMB04000 |
| D20 | Diode, 1N914 |
| C36 | Capacitor, Electrolytic, 220 μF, 50 VDC |
| C2 | Capacitor, Tantalum, 10 μF, 10%, 5 VDC |
| C1 | Capacitor, Polyester, 0.022 μF, 10%, 400 VDC |
| C3, C4, C6, C12, C13, C21, C22, C23 | Capacitor, Ceramic Chip, 0.1 μF 10%, 50 VDC, X7R, SMO |
| C7, C8 | Capacitor, Ceramic Chip, .001 μF, 10%, 50 VDC, X7R, SMO |
| C10 | Capacitor, Ceramic Chip, 470 pF, 5%, 50 VDC, C06, SMO |
| C11 | Capacitor, Ceramic Chip, 390 pF, 5%, 100 VDC, C06, SMO |
| C5 | Capacitor, Ceramic Chip, 100 pF, 5%, 100 VDC, C06, SMO |
| C33, C34 | Capacitor, Ceramic Chip, 27 pf, 0%, 200 VDC C06, SMO |
| C35 | Capacitor, .01 μf |
| R2, R6 | Resistor, SMO, 7.5 (Ohms), 5%, ¼W |
| R54 | Resistor, SMO, 402, 1%, ⅛W |
| R11 | Resistor, SMO, 787, 1%, 1/8 W |
| R52 | Resistor, SMO, 1.33K, 1%, 1/8 W |
| R1, R3, R5, R26 | Resistor, SMO, 2.0K, 5%, 1/8 W |
| R25 | Resistor, SMO, 2.10K, 1%, 1/8 W |
| R18 | Resistor, SMO, 2.55K, 1%, 1/8 W |
| R78 | Resistor, SMO, 2.61K, 1%, 1/8 W |
| R10 | Resistor, SMO, 3.32K, 1, 1/8 W |
| R53 | Resistor, SMO, 3.24K, 1%, 1/8 W |
| R17 | Resistor, SMO, 5.11K, 1%, 1/8 W |
| R22 | Resistor, SMO, 5.23K, 1%, 1/8 W |
| R8, R21, R79 | Resistor, SMO, 10K, 5%, 1/8 W |
| R16 | Resistor, SMO, 11K, 5%, 1/8 W |
| R1 | Resistor, SMO, 16K, 5%, 1/8 W |
| R4, R7, R13, R14, R15 | Resistor, SMO, 20K, 5%, 1/8 W |
| R19, R20 | Resistor, SMO, 40.2K, 1%, 1/8 W |
| R23, R24, R27 | Resistor, SMO, 51.1K, 1%, 1/8 W |
| R9 | Resistor, SMO, 100K, 5%, 1/8 W |
| R31a, R32a | Resistor, SMO, 400K, 5%, 1/8 W |
| R77 | Resisto, SMO, 10H, 5%, 1/8 W |
| RT1 | Thermister, 10K, 250C |

A portion of the disclosure of this patent document contains material which is subject to a claim of copyright protection. The copyright owner has no objection to the facsimile reproduction by anyone of the patent document or the patent disclosure, as it appears in the Patent and Trademark Office patent file or records, but otherwise reserves all other rights whatsoever.

While the invention has been described in conjunction with a specific embodiment, it is to be understood that many alternatives, modifications and variations will be apparent to those skilled in the art in light of the aforegoing description.

Accordingly, this invention is intended to embrace all such alternatives, modifications and variations which fall within the spirit and scope of the appended claims.

I claim:

1. A system for detecting intrusions into an area to be monitored, the system comprising:
   means for periodically directing a transmit signal into the area so that a plurality of echo signals will be reflected from objects intruding into the area;
   means for receiving echo signals reflected by an object or objects in the area;
   means for generating a signature data array derived by cumulatively processing an initial set of signature echo signals, the means for generating a signature data array comprising means for generating and storing an initial signature data array having a plurality of data bits corresponding to segments of the echo signals, and means for comparing each signature echo signal segment to a signature threshold value and for replacing a corresponding initial data bit value with a flag value if said segment exceeds the threshold value; and
   means for comparing non-signature data representing non-signature echoes received after reception of said signature echo signals to the signature data array and for generating an alarm signal when the non-signature data differs from signature data.

2. The invention of claim 1, further comprising:
   means for reducing the signature threshold value as a function of time.

3. A system for detecting intrusions into an area to be monitored, the system comprising:
   means for periodically directing a transmit signal into the area so that a plurality of echo signals will be reflected from objects intruding into the area;
   means for receiving echo signals reflected by an object or objects in the area;
   means for generating a signature data array derived by cumulatively processing an initial set of signature echo signals;
   means for comparing non-signature data representing non-signature echoes received after reception of said signature echo signals to the signature data array and for generating an alarm signal when the non-signature data differs from signature data; and means for comparing non-signature echo signal segments to a non-signature threshold value and ignoring segments which do not exceed said non-signature threshold.

4. The invention of claim 3, further comprising:

means for comparing each signature echo signal segment to a signature threshold value and for replacing a corresponding initial data bit value with a flag value if said segment exceeds the threshold value; and means for generating an alarm signal each time a non-signature echo signal segment exceeds the non-signature threshold value and no flag value is present in an corresponding portion of the signature data array.

5. The invention of claim 3, further comprising:

means for reducing the non-signature threshold value as a function of time.

* * * * *